Sept. 25, 1923.

E. K. SHOULTZ

LEAKPROOF VALVE

Filed Dec. 19, 1921

1,468,747

Inventor

Earl K. Shoultz.

By Lacy & Lacy, Attorneys

Patented Sept. 25, 1923.

1,468,747

UNITED STATES PATENT OFFICE.

EARL K. SHOULTZ, OF VINCENNES, INDIANA.

LEAKPROOF VALVE.

Application filed December 19, 1921. Serial No. 523,472.

*To all whom it may concern:*

Be it known that I, EARL K. SHOULTZ, a citizen of the United States, residing at Vincennes, in the county of Knox and State of Indiana, have invented certain new and useful Improvements in Leakproof Valves, of which the following is a specification.

The present invention relates to valves for high pressure pipes and the main object of the invention is to produce a valve that does not leak even under the highest steam or air pressure, which is a very common fault with ordinary valves. It is particularly well suited for pipe lines for kerosene and similar liquids, where ordinary valves are apt to leak, thereby causing considerable loss and sometimes even fires.

As there are no leather or copper gaskets or washers, or any other pliable material used in this valve no repacking is ever necessary after the parts have once been fitted together and this is the reason for this valve not leaking.

Another object of the invention is to construct the valve, so that no regrinding is required after the valve has been finished.

Still another object is to provide a lubrication for the moving parts of the valve, and this tends to faciliate operation and to give long life to the valve.

In the accompanying drawing one embodiment of the invention is illustrated, and

Figure 1:
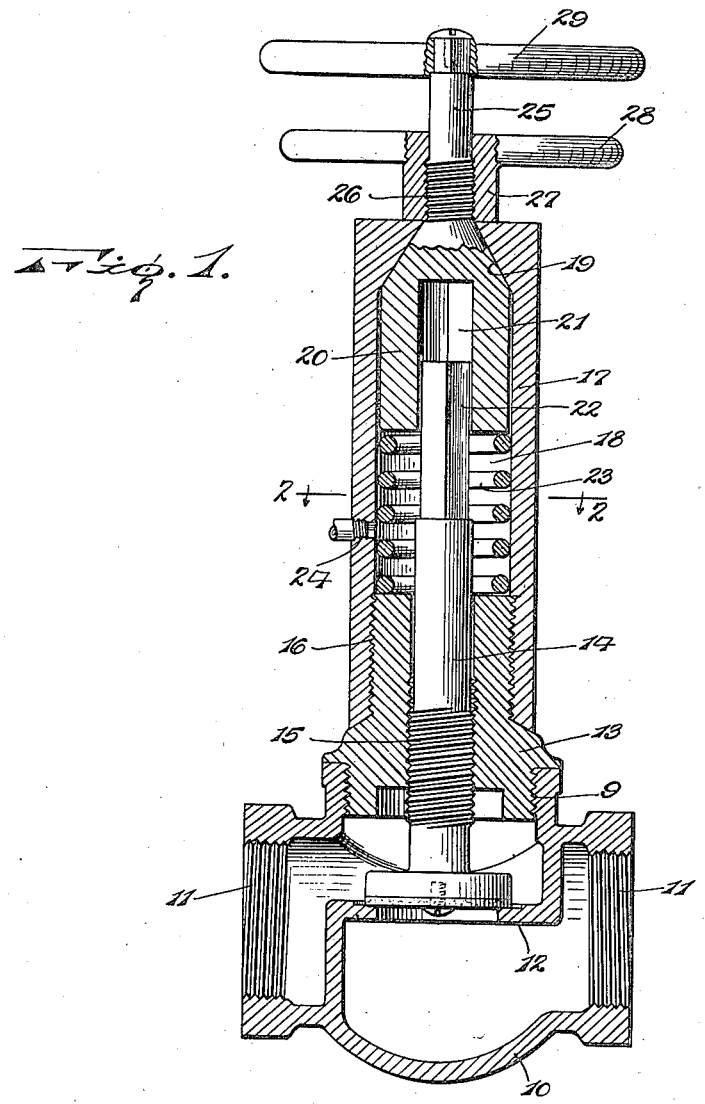

Figure 1 shows an axial vertical section of the valve, and

Figure 2:
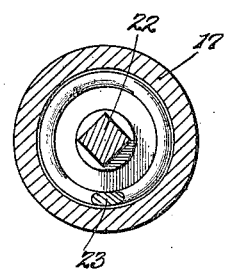

Figure 2 a transverse section along line 2—2 of Figure 1.

The valve body is denoted by the numeral 10 and is provided in the usual manner with threaded ends 11 for connecting the body to the steam or air pipes and a seat 12 is provided in the middle of the body, which is here shown for a flat headed valve but the construction is equally well applicable to gate, needle or flap valves.

On the upper side of the body 10 is secured, by means of threads 9, a shank 13 forming an axial bearing for a valve spindle 14 rigidly secured at the head of the valve. This spindle is threaded, as at 15 for engaging with corresponding threads in the bore of the shank 13, the latter being also threaded externally, as at 16, to receive the bonnet 17 extending in axial direction of the spindle and entirely enclosing the same.

Between the upper end of the shank 13 and the top of the bonnet 17 is formed a cylindrical chamber 18 terminating with the tapering aperture 19 through the top. In this chamber is inserted a plug 20 having the same taper at the end, the main part thereof being cylindrical and fitting in the chamber 18. This plug 20 is hollow, as at 21, and adapted to receive the square section end 22 of the spindle 14. Between the end of the shank 13 and the inner end of the plug 20, a helical spring 23 is inserted in the chamber 18 and exerting pressure in both directions so that the plug 20 is held tightly in the tapered seat 19 of the bonnet 17. At 24 is provided a threaded opening to receive a pipe for a lubricating device, such as a grease cup or any other efficient pressure lubricating system, which connects with the chamber and provides lubricating materials to the moving parts in the chamber and in the shank 13.

The tapered end of the plug 20 terminates with a cylindrical stem 25 which is threaded, as at 26, to receive a nut 27 provided with an annular rim 28, by means of which the plug 20 is drawn up tightly against the tapered surface 19 in the chamber so as to rigidly lock the parts together. At the extreme end of the stem 25 is keyed a hand wheel 29, which is intended for turning the plug 20 after the nut 27 has been loosened. The size of the hand wheel 29 and the annular rim 28 are such that, when the nut 27 has been loosened, the two can be conveniently gripped by one hand and turned together for the purpose of turning the plug 20. Through the intermediary of the keyed connection between the end 22 of the spindle and the plug 20, which is revoluble but not reciprocable in the chamber 18, the spindle 14 will now be revolved in the shank 13 and the valve raised from its seat through the threaded engagement between the shank 13 and the threaded portion 15 of the spindle, when the hand wheel 29 is turned in clockwise direction, and the valve will be lowered, when the hand wheel is turned in opposite direction.

It will be evident that the spring 23 serves to keep the connection between the plug 20 and the bonnet 17 tight at all times, and that the nut 27 prevents the plug from turning and the spindle to work up or down when the nut is drawn up tight against the end of the bonnet thereby forming an effective lock.

Having thus described the invention what is claimed as new is:

In a valve, a valve spindle, a valve body provided with an axial bearing for said spindle, a bonnet secured to said body and forming a cylindrical chamber around the free end of said spindle, said chamber having a tapered portion forming an aperture through the end of the bonnet, a plug corresponding in shape to the tapered portion of said chamber and being revoluble therein, said spindle having sliding connection with the plug, a threaded shank on said plug extending through said aperture, a hand wheel at the end of said shank, a lock nut engaging the threaded portion thereof, a compression spring in said chamber engaging the inner end of said plug, and a lubricating device attached to said bonnet and communicating with said chamber.

In testimony whereof I affix my signature.

EARL K. SHOULTZ.